(12) United States Patent
Esbensen et al.

(10) Patent No.: US 9,611,834 B2
(45) Date of Patent: Apr. 4, 2017

(54) METHOD AND ARRANGEMENT FOR CONTROLLING A WIND TURBINE

(71) Applicant: Siemens Aktiengesellschaft, Munich (DE)

(72) Inventors: Thomas Esbensen, Herning (DK); Ramakrishnan Krishna, Skjern (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/424,320

(22) PCT Filed: Mar. 21, 2013

(86) PCT No.: PCT/EP2013/055894
§ 371 (c)(1),
(2) Date: Feb. 26, 2015

(87) PCT Pub. No.: WO2014/048583
PCT Pub. Date: Apr. 3, 2014

(65) Prior Publication Data
US 2015/0226183 A1    Aug. 13, 2015

(30) Foreign Application Priority Data

Sep. 28, 2012    (EP) .................................. 12186571

(51) Int. Cl.
*F03D 7/02*     (2006.01)
*F03D 7/04*     (2006.01)
*F03D 9/00*     (2016.01)

(52) U.S. Cl.
CPC ........... *F03D 7/0276* (2013.01); *F03D 7/028* (2013.01); *F03D 7/0224* (2013.01);
(Continued)

(58) Field of Classification Search
CPC ...... F03D 7/0224; F03D 7/0276; F03D 7/028; F03D 9/002; F03D 7/0296; F03D 7/042
(Continued)

(56) References Cited

U.S. PATENT DOCUMENTS 4,357,542 A * 11/1982 Kirschbaum ......... F03D 7/0272
174/DIG. 15
4,584,486 A *  4/1986 Quynn ................... F03D 7/0224
290/44

(Continued)

FOREIGN PATENT DOCUMENTS

CN      101881254 A    11/2010
CN      102035309 A    4/2011
(Continued)

OTHER PUBLICATIONS

CN Office Action dated Nov. 1, 2016, for CN patent application No. 201380050867.1.

*Primary Examiner* — Viet Nguyen
(74) *Attorney, Agent, or Firm* — Beusse Wolter Sanks & Maire

(57) ABSTRACT

A method of controlling a wind turbine having a rotor to which at least one rotor blade is connected, is provided herein. The method includes operating the rotor according to a first rotational speed reference; and operating the rotor according to a second rotational speed reference above the first rotational speed reference, if a fluctuation of an actual rotational speed of the rotor decreases below a fluctuation threshold and/or if a blade pitch angle of the rotor blade increases above a blade pitch angle threshold. The method may further include wherein the rotor is operated according to the first rotational speed reference, if the fluctuation of an actual rotational speed of the rotor increases above another fluctuation threshold which is above the fluctuation threshold and/or if the blade pitch angle of the rotor blade (Continued)

decreases below another blade pitch angle threshold which is below the blade pitch angle threshold.

16 Claims, 4 Drawing Sheets

(52) U.S. Cl.
CPC ........... *F03D 7/0296* (2013.01); *F03D 7/042* (2013.01); *F03D 9/002* (2013.01); *F05B 2270/101* (2013.01); *F05B 2270/107* (2013.01); *F05B 2270/1033* (2013.01); *F05B 2270/20* (2013.01); *F05B 2270/327* (2013.01); *F05B 2270/335* (2013.01); *Y02E 10/723* (2013.01)

(58) Field of Classification Search
USPC .................................................. 290/44, 55
See application file for complete search history.

(56) References Cited

U.S. PATENT DOCUMENTS

| | | | | |
|---|---|---|---|---|
| 4,703,189 | A * | 10/1987 | DiValentin | F03D 7/0224 290/44 |
| 5,155,375 | A * | 10/1992 | Holley | F03D 7/0224 290/44 |
| 2009/0295159 | A1 * | 12/2009 | Johnson | F03D 7/0224 290/44 |
| 2010/0133817 | A1 * | 6/2010 | Kinzie | F03D 7/0224 290/44 |
| 2010/0133818 | A1 * | 6/2010 | Kinzie | F03D 7/0224 290/44 |
| 2010/0133826 | A1 * | 6/2010 | Santiago | F03D 7/0272 290/44 |
| 2011/0089694 | A1 * | 4/2011 | Arinaga | F03D 7/0224 290/44 |
| 2012/0091713 | A1 * | 4/2012 | Egedal | F03D 7/0224 290/44 |
| 2012/0211982 | A1 * | 8/2012 | Tanabe | F03D 7/0272 290/44 |
| 2013/0241209 | A1 * | 9/2013 | Andersen | F03D 7/028 290/55 |
| 2014/0017081 | A1 * | 1/2014 | Esbensen | F03D 7/0224 416/1 |

FOREIGN PATENT DOCUMENTS

| | | |
|---|---|---|
| EP | 2128437 | 12/2009 |
| EP | 2128437 A2 | 12/2009 |
| EP | 2249029 A2 | 11/2010 |
| WO | 2011150931 A2 | 12/2011 |

* cited by examiner

METHOD AND ARRANGEMENT FOR CONTROLLING A WIND TURBINE

CROSS REFERENCE TO RELATED APPLICATIONS

This application is the US National Stage of International Application No. PCT/EP2013/055894 filed Mar. 21, 2013, and claims the benefit thereof. The International Application claims the benefit of European Application No. EP12186571 filed Sep. 28, 2012. All of the applications are incorporated by reference herein in their entirety.

FIELD OF INVENTION

The present invention relates to a method and to an arrangement for controlling a wind turbine, in order in increase power production efficiency.

ART BACKGROUND

Conventionally, a wind turbine may be operated using a fixed or constant target rotational speed (also referred to as reference rotational speed or rotational speed set-point) and a fixed target power (also referred to as a reference power or a power set-point). In these conventional systems, a turbine controller may aim to hold this fixed target rotational speed and fixed target power at high wind speeds. In this case, there should be a sufficiently high wind speed in order to operate at these targets, otherwise the speed and/or power may be lower. The maximum rotational speed and the maximum power, where the mechanical structure or the electrical components will be damaged may lie above the target rotational speed and the target power.

Document EP 2 128 437 A2 discloses a method for increasing energy capture in a wind turbine, wherein an adjusted rotational speed set-point greater than the initial rotational speed set-point is determined in response to operational parameters which may include standardized environmental conditions, such as average wind speed, turbulence intensity or air density and the operational parameters may include generator speed, power output, turbulence intensity, wind shear, combination of ambient temperature and air pressure, air density, component temperatures, generator torque, current and generator rotor and stator, voltage in generator rotor and stator, power factor, power top vibration, drive train vibrations, yaw position and combinations thereof.

It has been observed that conventional wind turbines and wind turbine controllers and control methods are not in every situation capable of operating the wind turbine such as to provide satisfactory power production.

A technical problem to be solved by the present invention may be regarded as providing a method and an arrangement for controlling a wind turbine, wherein energy output of the wind turbine may be improved, while maintaining a secure operation and while avoiding damage or excessive loads on components of the wind turbine.

SUMMARY OF THE INVENTION

The technical problem is solved by the subject-matter of the independent claims. The dependent claims specify advantageous embodiments of the present invention.

In particular, embodiments of the present invention ensure that the wind turbine acts within the design specification but may allow adjustment of the target settings (such as target rotational speed and/or target power output) of the wind turbine such that maximum power/load/noise relationship is achieved. In particular, the design specifications met by embodiments of the present invention may include load requirements, temperature requirements, noise requirements, power requirements, etc. In particular, embodiments of the present invention may take into consideration varying operating conditions and different requirements for the individual system components without being too conservative.

Thereby, in particular, to maximize the efficiency of the turbine it has been found by the inventors that in conventional systems constraints may be too conservative and methods and arrangements according to the present invention employ adaptive constraints for operating the wind turbine. The inventors found that in conventional systems, where the target rotational speed and/or target power are fixed, these target values are very likely to be too conservative, since they have to consider worst-case wind speeds, turbulence, wind shear, ambient temperature, etc.

The present invention provides a method and an arrangement for controlling a wind turbine, wherein a rotational speed reference is increased relative to a conventional conservative rotational speed reference.

According to an embodiment of the present invention, it is provided a method of controlling a wind turbine having a rotor to which at least one rotor blade is connected, the method including operating the rotor according to a first rotational speed reference; and operating the rotor according to a second rotational speed reference above the first rotational speed reference, if a fluctuation of an actual rotational speed of the rotor decreases below a fluctuation threshold and/or if a blade pitch angle of the rotor blade increases (i.e. changes from lower to higher blade pitch angle) above a blade pitch angle threshold.

The wind turbine may include a wind turbine tower, a nacelle mounted on top of the wind turbine tower, wherein a rotor shaft to which one or more rotor blades are connected may be supported within the nacelle. Mechanically connected to the rotation shaft may be an electric generator which may output a power stream having a variable frequency. Further, the wind turbine may include a converter, such as a AC-DC-AC converter, which may convert the variable frequency power stream output from the generator to a direct current power stream and from the direct current power stream to a fixed frequency (such as 40 Hz or 60 Hz) power stream which may then be, in particular via one or more transformers, supplied to a utility grid which may supply electric energy to a plurality of consumers.

The controlling the wind turbine may for example include controlling an actuator which is arranged and adapted to adjust a rotor blade pitch angle of the one or more rotor blades which are connected to the rotation shaft. Adjustment of the rotor blade pitch angle may influence the power coefficient of the rotor blades, i.e. a ratio of the extraction of the energy from the wind.

In particular, the power coefficient may be represented (for a considered fixed wind speed and fixed rotational speed) as a relationship between the power coefficient and the blade pitch angle. In particular, the power coefficient may be defined as the ratio of power enhanced from the available wind power, and thereby indicated the efficiency of the wind turbine rotor. The power coefficient $C_p$, may be a ratio that can be expressed as dependant on the rotor blade pitch angle and the tip speed ratio. The blade pitch angle may be the angle between the blade chord line and the rotor plane of rotation. The tip speed ratio may be defined as the ratio of rotor tip speed divided by windspeed (RotorSpeed*RotorRadius/windSpeed). In particular, the power coefficient may be larger for small pitch angles than for larger pitch angles. In particular, by decreasing the blade pitch angle, more energy may be extracted from the incoming wind by the rotor blade at which the blade pitch angle has been adjusted.

Further, controlling the wind turbine may also additionally or alternatively include controlling a converter of the wind turbine by supplying a particular power reference, such that the wind turbine outputs a predetermined power.

Operating the rotor according to the first rotational speed reference may include supplying the first rotational speed reference to a turbine controller which may then, based on the first rotational speed reference, determine a blade pitch angle which is to be set at the rotor blade in order to achieve a rotational speed of the rotor corresponding to the first rotational speed reference. Further, the rotor blade pitch angle may be adjusted according to the determined blade pitch angle such as to achieve the rotational speed corresponding to the first rotational speed reference.

Operating the rotor according to the second rotational speed reference may be performed before or after operating the rotor according to the first rotational speed reference. In particular, while operating the rotor according to the first rotational speed reference and/or while operating the rotor according to the second rotational speed reference, the blade pitch angle may be kept constant or may be changed, in particular in dependence of a wind speed, in order to maintain a constant power output. In particular, when the wind speed increases, and while the rotor is operated according to the first rotational speed reference, the blade pitch angle may have been increased (in order to maintain a constant power output while the wind speed is increasing). Thereby, the blade pitch angle may have been increased to lie above a blade pitch angle threshold. If the blade pitch angle of the rotor blade has been increased above the blade pitch angle threshold, the rotor may then switch from operating the rotor according to the first rotational speed reference to operating the rotor according to the second rotational speed reference. Thereby, operation of the rotor at a rotational speed higher than when operating the rotor according to the first rotational speed reference may be achieved. Thereby, the possibility is provided to also increase power output of the wind turbine. Thereby, the efficiency of the wind turbine, in particular regarding power output, may be increased.

According to embodiments of the present invention, a paradigm shift is proposed, wherein a wind turbine may no longer operate according to fixed set-points but may adapt online to the conditions of the individual system components.

The fluctuation of an actual rotational speed of the rotor may be represented by for example a standard deviation of the rotational speed of the rotor, an absolute change of the rotational speed of the rotor, or a rate of change of the rotational speed of the rotor. If the fluctuation of the actual rotational speed of the rotor is below or decreases below a fluctuation threshold, the wind turbine rotor may be controlled in a reliable manner. If the fluctuation of the actual rotational speed is above the fluctuation threshold, the rotational speed of the rotor may rapidly change and a controllability of the rotor may be impaired or may be even impossible.

Further, if the blade pitch angle of the rotor blade increases above the blade pitch angle threshold, a small change of the blade pitch angle may have a relatively large effect on the behaviour, in particular rotational speed of, the rotor, such that controllability of the rotor when the blade pitch angle is above the blade pitch angle threshold may be improved than in the case where the blade pitch angle of the rotor blade is below the blade pitch angle threshold.

Thus, in situations, where the controllability of the wind turbine rotor is high, the rotor may be operated at a higher rotational speed than in situations, where the controllability is low. Thereby, the energy output of the wind turbine may be improved.

The inventors found that limiting the rotational speed may be tradeoff between the performance, loading and noise and may not be a design driver on its own right, since efficiency may be reduced when the rotational speed is limited. Therefore, it may be of interest to increase the rotational speed of the turbine and thereby increase the efficiency provided that the other parameters are taken into account.

As has been mentioned above, the maximum allowed rotational speed and the maximum allowable power of the wind turbine may always be above the first rotational speed reference and the second rotational speed reference (which may also be referred to as target speeds). These maximum values, if exceeded may result in structural and component damage in a wind turbine unit. In particular, a sufficient margin from the target speed or target power and the maximum allowable speed, maximum allowable power, respectively, may be given, in order to ensure controllability, so that certain events (wind gusts, etc.) do not force the wind turbine into a situation, where the wind turbine is operated on or above the maximum levels. However, if the wind turbine is operating in a condition, where controllability is improved, then the size of this margin may be reduced, as the risk of being pushed into or above the maximum level operation (an over-speed or over-power event) may also be reduced. In particular, regarding safety considerations, the rotational speed may be of particular interest, since it may be a mechanical component that demands the highest safety.

According to an embodiment of the present invention, the rotor is operated according to the first rotational speed reference, if the fluctuation of an actual rotational speed of the rotor increases above another fluctuation threshold which is above the fluctuation threshold and/or if the blade pitch angle of the rotor blade decreases (i.e. changes from higher to lower blade pitch angle) below another blade pitch angle threshold which is below, in particular by 1° to 3° below, the blade pitch angle threshold. Thereby, too rapidly switching back and forth between the first rotational speed reference and the second rotational speed reference may be reduced or even avoided in that the threshold may depend on the direction of the change of the blade pitch angle with time, in particular they may depend on whether the blade pitch angle increases with time to lie above the blade pitch angle threshold or whether the blade pitch angle decreases with time to lie below the other blade pitch angle threshold. In an analogous way, the switching between the first rotational speed reference and the second rotational speed reference may depend on a direction of change of the fluctuation of the actual rotational speed, i.e. whether the fluctuation increases above the other fluctuation threshold or whether the fluctuation decreases below the fluctuation threshold. Thereby, instability may be reduced and stability of the control method may be improved.

In particular, thereby, stability and protection from rapidly changing setpoints may be obtained through the employment of hystheresis.

According to an embodiment of the present invention, the blade pitch angle threshold lies above an optimal blade pitch angle to which an optimal power coefficient is associated. In particular, the relationship between the optimal blade pitch angle and the optimal power coefficient may be established for a fixed wind speed and a fixed rotational speed of the rotor. In particular, for different wind speeds and/or different rotational speeds, the relationship between the power coefficient and the blade pitch will vary. The optimal blade pitch angle (for a given wind speed and a given rotational speed of the rotor) may be that blade pitch angle at which the maximal power extraction may be achieved. When the blade pitch angle is set to the blade pitch angle threshold, extraction of the power from the wind may be less than in the situation where the blade pitch angle is set to the optimal blade pitch angle. However, at the blade pitch angle threshold (and/or above), a small change in the blade pitch angle may result in a larger effect regarding regulation of the rotational speed than at the optimal power coefficient. Thereby, controllability of the wind turbine may be improved, while allowing also increasing the power output of the wind turbine.

According to an embodiment of the present invention, the ratio deltaCp/deltaPitch may be lower close to the optimal pitch angle, and may increase as the blade pitch angle is increased and the rotor is made less efficient. This means that a given change in pitch angle away from optimum, may entail a significantly larger change in CP compared to the pitch angle being around the optimum pitch angle. Thereby, while operating away from the optimum pitch angle, controllability may be improved significantly.

In particular, a decrease of the power coefficient with increasing blade pitch angle may be smaller at the optimal blade pitch angle than at the blade pitch angle threshold.

Thereby, controllability at the blade pitch angle threshold or above the blade pitch angle threshold may be increased relative to below the blade pitch angle threshold. Thereby, it may be allowed to operate the wind turbine at a higher rotational speed than in the situation where the blade pitch angle is below the blade pitch angle threshold.

According to an embodiment of the present invention, aerodynamic thrust is larger at the optimal blade pitch angle than at the blade pitch angle threshold. Further, a change in the aerodynamic thrust when changing the blade pitch angle may be lower when starting at or above the blade pitch angle threshold than when operating around the optimal pitch angle.

Thereby, loads acting on the wind turbine may be reduced and the control method may be improved.

According to an embodiment of the present invention, controllability of the operational condition of the rotor is better at pitch angles above the pitch angle threshold than at pitch angles below the blade pitch angle threshold.

In particular, when the controllability is improved in a particular range of blade pitch angles, the rotational speed of the rotor may be increased without introducing the risk that components of the wind turbine are operated outside their operation limits.

According to an embodiment of the present invention, the second rotational speed reference is determined based on the actual blade pitch angle, in particular based on a deviation of the blade pitch angle from the blade pitch angle threshold.

In particular, the second rotational speed reference may be constant, when the actual blade pitch angle is above the blade pitch angle threshold. Alternatively, the second rotational speed reference may vary with different blade pitch angle angles which are above the blade pitch angle threshold. In the former case, the control method and control arrangement may be simplified, while in the latter embodiment the energy output may even further be improved, but the method may be more complex and complicated.

According to an embodiment of the present invention, changing of operating the rotor according to the first rotational speed reference to operating the rotor according to the second rotational speed reference includes supplying a control signal indicative of the second rotational speed reference to a turbine controller; determining a decrease of an actual pitch angle based on a relationship between power coefficient and blade pitch angle; and decreasing the blade pitch angle according to the determined decrease of the blade pitch angle.

The speed-blade pitch controller may be a controller of the wind turbine which may be designed and adapted to control blade pitch angles of the rotor blades, in order to achieve a particular rotational speed which has been specified by a rotational speed reference, such as the second rotational speed reference or the first rotational speed reference. In particular, by decreasing the actual pitch angle, the rotational speed may be increased from the first rotational speed to the second rotational speed. Thereby, the method may be simplified, since only or mainly the blade pitch angle may be required to be adjusted, in order to achieve the second rotational speed. In other embodiments, changing operating the rotor according to the first rotational speed to operating the rotor according to the second rotational speed reference may include employing further control methods and control components.

According to an embodiment of the present invention, operating the rotor according to a second rotational speed reference is performed, if the blade pitch angle of the rotor blade is in a pitch angle range including pitch angles above the blade pitch angle threshold and below a further pitch angle threshold.

If the blade pitch angle lies outside the pitch angle range, the rotor may be operated according to a still further rotational speed reference. Thereby, flexibility of the method may be improved. In particular, at very high pitch angles which may be outside the pitch angle range, the rotor may be operated according to a further rotational speed which may be below the second rotational speed and/or also below the first rotational speed. Thereby, damage of components of the wind turbine may be reduced or even avoided.

According to an embodiment of the present invention, operating the rotor according to a first rotational speed reference is performed in a wind speed range, where the actual rotational speed is substantially maintained constant according to the first rotational speed reference, wherein within the wind speed range the blade pitch angle is adjusted by increasing the blade pitch angle with increasing wind speed.

According to embodiments of the present invention, the wind turbine controller may operate in different control regions. Optimal power production of the wind turbine at below rated power may depend on the ability to apply an optimal pitch angle and track the optimal rotor tip-speed ratio (the ratio of rotor tip speed to effective wind speed) at below rated rotational speed. The controller or control method according to embodiments of the present invention may accomplish this by setting a predetermined pitch angle and a generator (or converter) reference power (or torque) to balance the rotor aerodynamic torque.

Below a rated rotational speed (which may also be referred to as below the first rotational speed reference) (which may be called the variable-speed region), the pitch angle may normally be fixed, or varied a few degrees as a function of the operating point. The pitch angle may be modified in this region with the aim of giving the highest CP, meaning the blades will be pitched into the most aggressive position. The power (or torque) reference may be set as a function of the rotational speed (or wind speed).

To reduce noise and/or load, the rotational speed may be fixed in a so-called constant-speed region for higher wind speeds. Herein, the blade pitch angle may change (in particular increase) as a function of the power, torque or wind speed, while the power (or torque) reference may be adjusted in order to maintain the desired speed.

To reduce structural electrical loads, the turbine may enter a so-called constant-power region for even higher wind speeds. The power (or torque) may be fixed, while the pitch angle may be adjusted (in particular increased) to maintain the rated speed.

It may be in this region which may conventionally be referred to as constant-power region, where the rotor may be switched from operating the rotor according to the first rotational speed to operating the rotor according to the second rotational speed reference. Further, unlike conventional methods, in this region also the power output may be increased, in particular if the electrical components of the wind turbine allow power increase.

In the constant-speed region, the control method may control the wind turbine or may control the power (or torque) based on the speed error (this controller may be referred to as speed-power controller). Further, in the region, where full power is achieved (which has been conventionally referred to as constant-power region), the control method or controller may control the rotational speed using the pitch system (the corresponding controller may be referred to as speed-pitch controller). Also, in this region, the power may be increased in contrast to conventional methods and systems.

The wind speed range, where the actual rotational speed is substantially maintained constant may also be referred to as constant-speed region. In a portion of lower wind speeds in this constant-speed region, the power may not have yet reached the rated power. However, in a portion of the constant-speed region above a wind threshold or above a wind speed threshold, the power output may have reached the rated power. Further, in a wind speed region where the rated power has been reached but where the pitch angle has been increased above the blade pitch angle threshold, the rotational speed may be increased from the first rotational speed to the second rotational speed and further also (depending on operating conditions of electrical components of the wind turbine), the power output may be increased relative to the rated power output, to achieve a power output when operating the rotor according to achieve first rotational speed reference.

According to an embodiment of the present invention, operating the rotor according to a second rotational speed reference is performed in a further wind speed range above the wind speed range.

According to an embodiment of the present invention, when operating the rotor according to the second rotational speed reference, power output of the wind turbine is increased relative to power output when operating the rotor according to the first rotational speed reference. Thereby, energy output of the wind turbine may be increased. In particular, mechanical stability and compliance with mechanical load threshold may be ensured, since the controllability of the rotor may be significantly improved. Further, the decision whether to increase power output or not may be based on operational conditions of one or more electrical components of the wind turbine.

According to an embodiment of the present invention, the method further includes monitoring at least one electrical component of the wind turbine for an operational condition; The operational condition (s) may be monitored in order to ensure electrical component safety.

Thereby the turbine controller may be able to reduce power generation when the monitored parameter(s) indicate that a component is reaching design limits.

Monitoring the at least one electrical component may include performing one or more measurements using one or more sensors, such as a temperature sensor, a current sensor, a voltage sensor, a cooling fluid flow sensor, etc. In particular, the at least one electrical component may be required to be operated according to limited operational conditions, which may limit in particular temperature, current, voltage, etc. If the monitoring yields, that the electrical component is being operated well within margins of their operational limiting conditions, the power output of the wind turbine may be increased. In particular, power output may be increased depending on how close the electrical component approached its operational limits. Thereby, energy output of the wind turbine may be improved.

According to an embodiment of the present invention, the electrical component of the wind turbine includes at least one of a converter; a transformer; a cable; a capacitor; an inductor; and a filter, wherein the operational condition of the component includes at least one definition of a temperature of the component; a cooling of the component; and an electrical load of the component.

Other electrical components may be monitored and other operational conditions may be determined.

It should be understood that features individually or in any combination disclosed, described, employed or applied to a method of controlling a wind turbine may also be applied individually or in any combination to an arrangement for controlling a wind turbine according to an embodiment of the present invention and vice versa.

According to an embodiment of the present invention, it is provided an arrangement for controlling a wind turbine having a rotor to which at least one rotor blade is connected, the arrangement including a speed-blade pitch controller adapted to operate the rotor according to a first rotational speed reference, wherein the speed-blade pitch controller is adapted to operate the rotor according to a second rotational speed reference above the first rotational speed reference, if a fluctuation of an actual rotational speed of the rotor decreases below a fluctuation threshold and/or if a blade pitch angle of the rotor blade increases above a blade pitch angle threshold.

Embodiments of the present invention are now described with reference to the accompanying drawings. The invention is not restricted to the illustrated or described embodiments.

The aspects defined above and further aspects of the present invention are apparent from the examples of embodiment to be described hereinafter and are explained with reference to the examples of embodiment. Aspects of the invention will be described in more detail hereinafter with reference to examples of embodiment but to which the invention is not limited.

DETAILED DESCRIPTION

Figure 1:
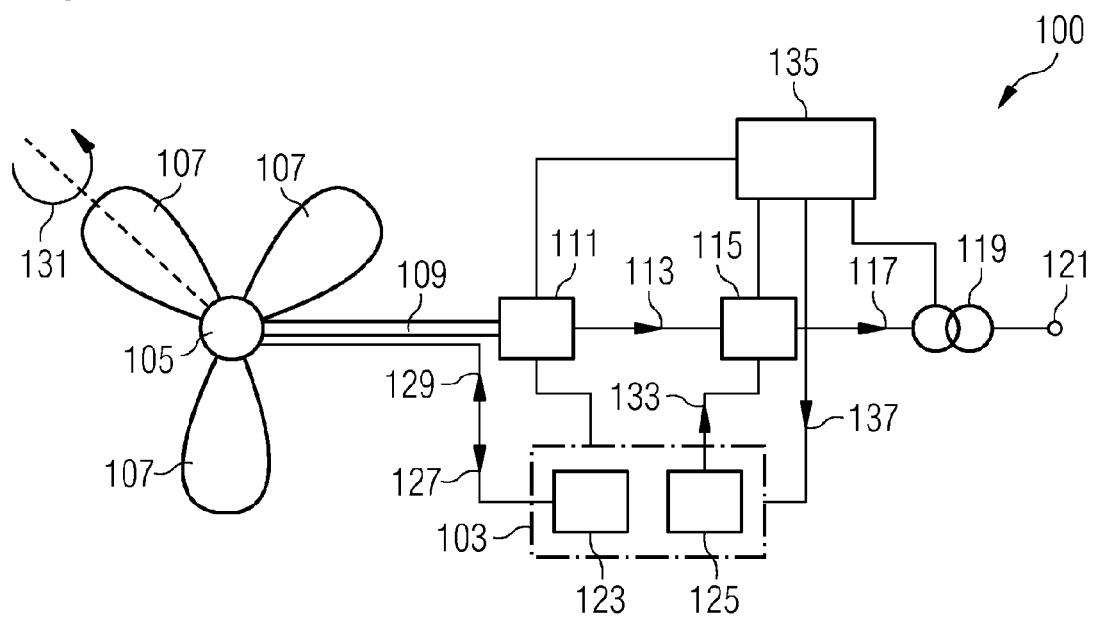
FIG. 1 schematically illustrates a wind turbine including an arrangement for controlling the wind turbine according to an embodiment of the present invention.

The illustration in the drawings is in schematic form. It is noted that in different figures, similar or identical elements are provided with the same reference signs or with reference signs, which are different from the corresponding reference signs only within the first digit.

FIG. 1 schematically illustrates a wind turbine 100 including an arrangement 103 for controlling the wind turbine according to an embodiment of the present invention. The wind turbine includes a hub 105 at which plural rotor blades 107 are connected, wherein the hub is supported within a not illustrated nacelle which is mounted on top of a wind turbine tower. The wind turbine blades 107 are mechanically fixed to a rotation shaft 109 which rotates upon impact of wind onto the wind turbine blades 107. The rotating shaft 109 drives a generator 111 which provides an electrical output stream 113 to a AC-DC-AC converter 115 which converts the variable frequency output stream 113 to a fixed frequency output stream 117 which is then via a transformer 119 transformed to a higher voltage and output at an output terminal 121 of the wind turbine which may for example be connected to a point of common coupling to which a number of wind turbines are connected. From the point of common coupling, the energy may be supplied to a utility grid.

The arrangement 103 for controlling the wind turbine 100 includes a speed-pitch controller 123 and a speed-power controller 125. The speed-pitch controller 123 is adapted to operate the rotor 109 according to a first rotational speed reference and also according to a second rotational speed reference, if a blade pitch angle 127 supplied from the blade pitch system is above or increases above a blade pitch angle threshold, as will be explained in detail below. In particular, the speed-pitch controller 123 transmits an actuator control signal 129 which causes an actuator to adjust the blade pitch angle 131 of the rotor blade 107.

Further, the arrangement 103 includes a speed-power controller 125 which is connected to the converter 115 and supplies to the converter a power (or torque) reference 133 which define the power output at the output terminal 121. In particular, power output is controlled by the converter in that plural power transistors within the converter 115 are switched using pulse modulation signals in order to control a torque of the rotation shaft 109 as well as the power output.

A monitoring system 135 monitors electrical components of the wind turbine, such as the generator 111, the converter 115, the transformer 119 as well as other not illustrated electrical components. Measurement results 137 of the monitoring, such as current signals, temperature signals, voltage signals and other load signals, are supplied to the arrangement 103 for controlling the wind turbine. Based on the measurement signals 137, the arrangement 103 may decide to increase power output or not. In particular, the speed-power controller 125 is then employed to send an adapted power reference 137 to the converter 115, in order to achieve the desired power output increase.

The arrangement 103 illustrated in FIG. 1 is adapted to carry out a method of controlling a wind turbine according to an embodiment of the present invention, as will be explained below in some more detail.

Figure 2:
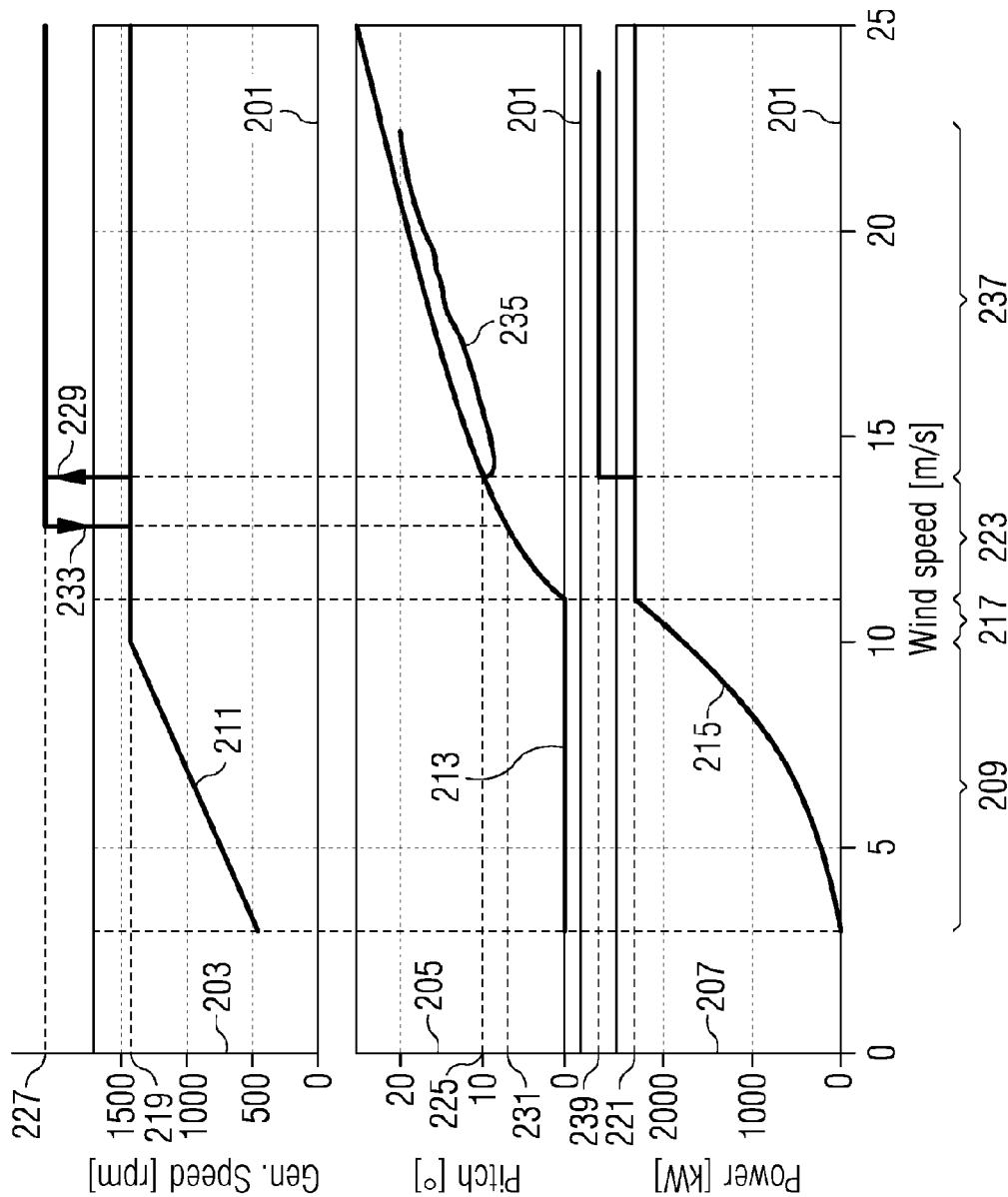
FIG. 2 schematically illustrates graphs considered or being applied during a method of controlling a wind turbine according to an embodiment of the present invention.

FIG. 2 illustrates an upper graph, wherein on ordinate 203 the generator speed is indicated, a middle graph, wherein on an ordinate 205 the blade pitch angle is indicated, and a lower graph, wherein at an ordinate 207 the power output is indicated. In all three graphs illustrated in FIG. 2, on an abscissa 201 the wind speed is indicated.

According to an embodiment of the present invention, the method of controlling the wind turbine operates in different control regions which may partly be distinguished by the wind speed which prevails in the different control regions or which may partly be distinguished by pitch angles which prevail in the different regions. In a variable-speed region 209, the generator speed 211 increases in a linear manner with the wind speed. In this variable-speed region 209, the pitch angle 213 is substantially kept constant at a value of 0°. The power output 215 within this variable-speed region 209 increases.

In a constant speed region 217, the generator speed 211 stays constant at a first rotational speed 219 which corresponds to a first rotational speed reference according to which a rotor blade pitch control signal 129 is sent by the speed-pitch controller 123 to the pitch system. In the constant-speed region 217, the pitch angle stays substantially constant at 0°. Further, in the constant-speed region 217, the output power 215 still increases, to reach a rated output power 221 at the upper end of the constant-speed region 217, which corresponds to a lower end of a first constant-power region 223.

In the first constant-power region 223, the generator speed 211 stays substantially constant at the first rotational speed 219. The pitch angle increases within the first constant-power region 223 from the pitch angle 0° to a blade pitch angle threshold 225, in order to keep the output power in this first constant-power region 223 at the rated output power 221.

When the wind speed increases beyond the wind speed region 223, the pitch angle needs to be increased above the blade pitch angle threshold 225, in order to keep the power output 215 at the rated power output 221. In contrast to conventional control methods, however, the rotational speed of the rotor is adjusted to a second rotational speed 227 which is above the first rotational speed 219. In particular, when increasing the blade pitch angle 213 above the blade pitch angle threshold 225, the rotational speed is increased from the first rotational speed to the second rotational speed 227 according to the arrow 229. In contrast, when the blade pitch angle 213 decreases from higher values below another blade pitch angle threshold 231, the rotational speed of the rotor is decreased from the second rotational speed 227 to the first rotational speed 219 according to the arrow 233. Thereby, some hysteresis is provided, which may improve the stability of the control method.

In particular, increasing the rotational speed of the rotor from the first rotational speed 219 to the second rotational speed 227 may be achieved by actually decreasing the blade pitch angle such as for example by the curve 235. In other embodiments, the curve 235 may have another shape than illustrated in FIG. 2.

In particular, in a second constant-speed region 237, where the blade pitch angle 213 is above the blade pitch angle threshold 225, the rotational speed of the rotor may be increased from the first rotational speed 219 to the second rotational speed 227. Also in this second constant power region 237, the power output may be increased from the rated power output 221 to another rated power output 239 which may be above the rated power output 221. In particular, increasing the power output may be achieved by supplying, from the speed-power controller 125, a power reference 133 to the converter 115, as is illustrated in FIG. 1.

According to other embodiments of the present invention, the increase of the power output may not necessarily coincide with the location or instance, where the blade pitch angle reaches the blade pitch angle threshold. Thus, the other rated power output 239 may be achieved to for example lie beyond (in particular above) the border between the first constant-power region 223 and the second constant power region 237.

In particular, a maximum power limit of the turbine 100 may be defined or given by dimensions of the electrical components that constitute the drive train (such as generators 111, converter 115, transformer 119, capacitor bank, etc.), and also torque levels in the drive train. If the rotational speed is increased from the first rotational speed 219 to the second rotational speed 227, providing an increased controllability of the rotor and the whole wind turbine, then the only limiting factor on the increased power production may be the conditions of the electrical components (provided that power is only increased to a level so that the resulting torque on the drive train in an acceptable range).

Figure 3:
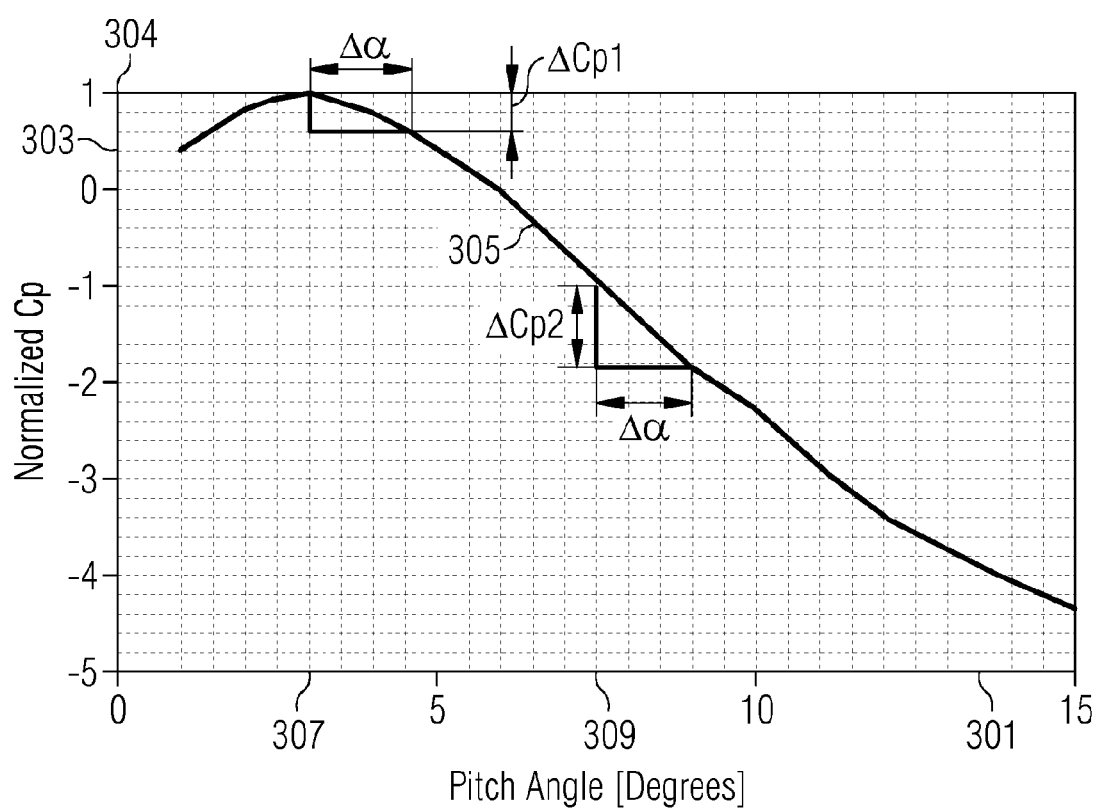
FIG. 3 illustrates a relationship between a power coefficient and a blade pitch angle considered in a method according to an embodiment of the present invention.

FIG. 3 shows a relationship between the power coefficient (Cp) and the blade pitch angle, wherein the blade pitch angle is indicated on an abscissa 301 while the normalized power coefficient is indicated at an ordinate 303. The curve 305 indicates the relationship between the normalized power coefficient and the blade pitch angle. In particular, FIG. 3 illustrates the turbine power efficiency as a function of the blade pitch angle for a given wind speed and a given rotational speed of the rotor. Reference sign 307 indicates an optimal blade pitch angle at which the power coefficient is maximal. Further, reference sign 309 illustrates an exemplary blade pitch angle threshold, such as the blade pitch angle threshold 225 illustrated in FIG. 2. As can be seen from FIG. 3, a change in the pitch angle by an amount Δ yields a reduction ACp1 at the optimum blade pitch angle 307 and a reduction ACp2 at the exemplary blade pitch angle threshold 309, wherein ACp2>ACp1. At the blade pitch angle threshold 309, the controller, such as controller 123 illustrated in FIG. 1, can therefore in a very short time in a very reliable manner reduce the energy capture of the wind and thereby be able to fast stop the turbine.

Figure 4:
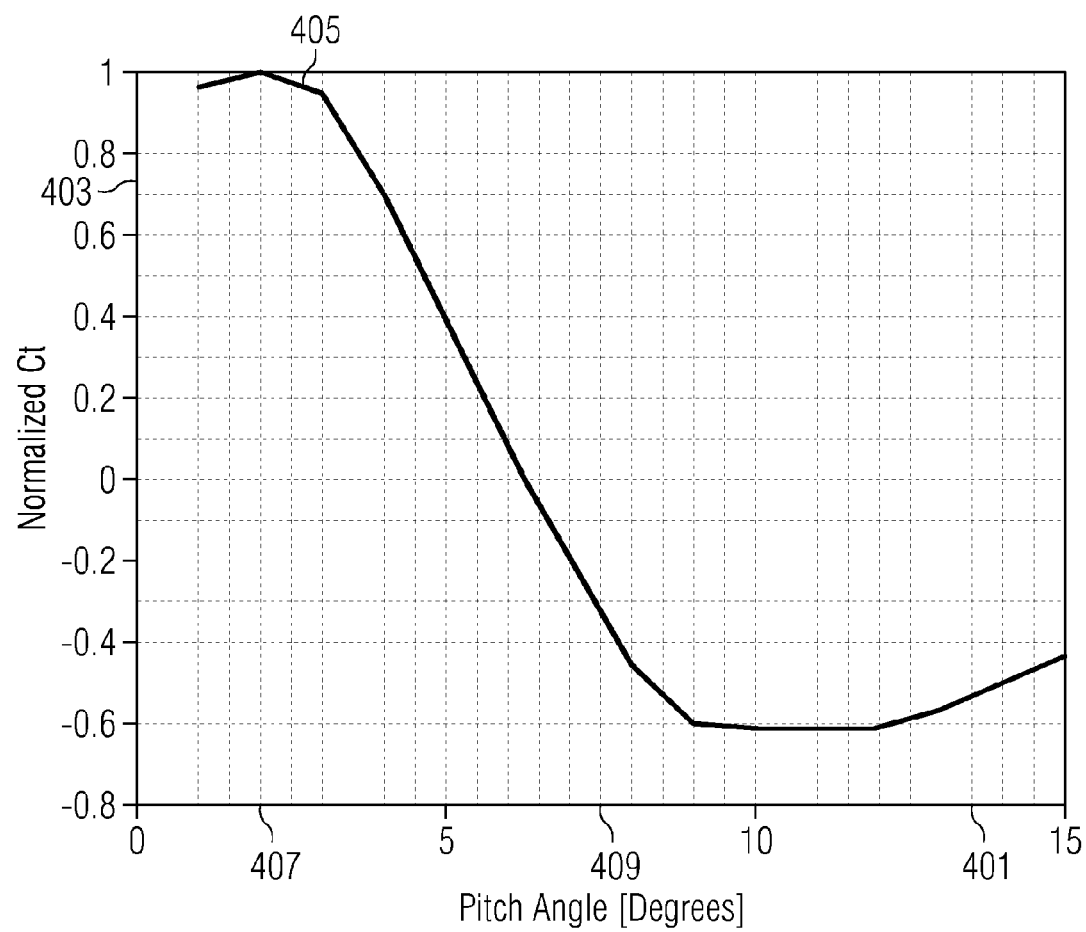
FIG. 4 illustrates a relationship between a thrust and a blade pitch angle considered in a method according to an embodiment of the present invention.

FIG. 4 illustrates a graph, wherein on an abscissa 401 the blade pitch angle is indicated while on an ordinate 403 the normalized thrust coefficient (Ct) is indicated. The curve 405 illustrates the relationship between the thrust coefficient Ct and the blade pitch angle. Again, the curve 405 is indicated for a fixed wind speed and a fixed rotational speed. Ct is proportional to the aerodynamic thrust force acting on the wind turbine. As can be taken from FIG. 4, the maximum thrust on the rotor is achieved at the energy-wise optimal pitch angle 407. However, this also means that the absolute change in thrust when it is pitched away from the energy-wise optimal pitch angle to the stop pitch angle is very large. This large change in thrust force causes extreme loading on the turbine. If the pitch angle is already pitched away from the energy-wise optimal pitch angle 407, such as when already at the blade pitch angle threshold 409, then the absolute thrust change may be significantly smaller when pitching towards the stop position.

So it may be taken from the FIGS. 3 and 4, once the pitch angle is already away from the optimal pitch angle 307, 407, the turbine controller, such as controller 123 illustrated in FIG. 1, may be able to stop the turbine faster, because the large reduction in Cp without a huge change in thrust force. Together, this may yield a lowered extreme loading of the turbine in emergency events.

In practice, the turbine rotational speed set-point (or also referred to as rotational speed reference) may be controlled by selecting a maximum rotational speed based on the current pitch angle. Thereby, the active speed limit for the turbine may be chosen accordingly to the current operational conditions, namely the pitch angle. Further, interdependencies may apply, such as a dependence on pitch angle and time, etc.

Again with reference to FIG. 2, in the first constant-power region 223, the pitch angle 213 is altered by the controller, to keep the rotational speed for increasing wind speeds substantially constant. In this case the turbine pitches to feather and Cp declines. Once the pitch angle reaches the blade pitch angle threshold 225, the rotational speed is changed from the first rotational speed 219 to the second rotational speed 227. Thus, the speed reference is increased. While the wind further increases into the region 237, the turbine controller speed reference may again be fixed to the new value 227, thus may be kept constant. According to an embodiment, the controller speed set-point (rotational speed target) may be increased when in a "safe" operating region (i.e. the controllability is good). This may be the case when the pitch angle is significantly (some degrees) away from the optimal pitch angle. Alternatively, to using the pitch angle a rotor acceleration or deviation of the rotor acceleration may be used instead or additionally.

Once the turbine has increased its rotational speed from the first rotational speed to the second rotational speed, the torque or the drive train may be reduced and may give room for increasing the power production in that respect. However, while the turbine is operated with increased speed compared to the conservative target set-point (the first rotational speed), the limitation of the power production may be driven by the electrical components. Therefore, a monitoring system 135 may be employed which may be enabled to monitor several electrical components of the wind turbine. This may only be performed when the wind turbine rotational speed is increased to the second rotational speed.

When the measurement results 137 from the monitoring equipment 135 are available to the arrangement 103, the controller power set-point (power target) 133 may be increased when the power electronic components are in a "safe" operating state (temperatures, cooling, etc. are good).

Further, it should be noted that some manufacturers/turbines sent a torque reference (instead of a power reference 133) to the converter 115. According to another embodiment, the controller sent a torque reference instead of a power reference. If the nominal torque is maintained, this means that the output power will increase just by increasing the speed set-point. In the setup where a power reference is sent to be converted, the controller may actively have to increase the power reference to increase the output power.

According to an embodiment, a method for controlling a power and a rotational speed set-point of a variable speed wind turbine is provided, wherein the method is configured for operating the turbine between a lower rotational speed set-point level and an upper rotational speed set-point level, wherein the upper rotational speed set-point has two levels characterized in that the method for controlling the wind turbine includes the following steps to increase energy output: compare an actual pitch angle or pitch angle reference to a predetermined pitch angle threshold and increase an upper rotational speed set-point level from a first level to a second level when an actual pitch angle or pitch angle reference is above the predefined pitch angle threshold, and compare an actual temperature level of an electrical component with a predetermined temperature threshold and increase the power set-point in order to increase the output power.

According to an embodiment of the present invention, a turbine is operated at its two constraints according to the conditions on the turbine. Thereby, this may not be done by determining the mechanical loads acting on the turbine but by making sure that the turbine can react fast and in safe manner if wind speed increases rapidly avoiding risk of overspeed and excessive loading on the wind turbine.

The rotational speed and/or the power setting may only be increased when the turbine is an "agile" state, so fast reaction may be possible, when wind speed is increasing or a gust is coming and this way may avoid overspeeds and overload situations.

According to embodiments of the present invention, the wind turbine may be operated closer to the design limits without exceeding them. Thereby, the full potential of the wind turbine may be exploited or fulfilled and thereby energy production may be increased in a safe manner.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 wind turbine
103 arrangement for controlling the wind turbine 105 hub
107 rotor blades
109 rotation shaft
111 generator
113 power stream
115 converter
117 power stream
119 transformer
121 wind turbine output terminal
123 speed-pitch controller
125 speed-power controller
127 pitch angle signal
129 blade pitch angle actuator control signal
131 blade pitch angle
133 power reference or torque reference
135 monitoring equipment
137 monitoring measurement signals
201 abscissa
203,205,207 ordinates
209 variable speed region
211 generator speed
213 pitch angle
215 power output
217 constant-speed region
219 first rotational speed
221 rated power output
223 first constant-power region
225 blade pitch angle threshold
227 second rotational speed
229 adjustment of the rotational speed coming from smaller to higher blade pitch angles
231 another blade pitch threshold
233 adjustment from the second rotational speed to the first rotational speed
235 decrease blade pitch angle
237 second constant power region
239 another rated power output
301, 401 abscissa
303,403 ordinate
305 relationship power coefficient versus blade pitch angle
Δ change in blade pitch angle
ΔCp1,2 changes in the power coefficient
405 relationship between thrust and blade pitch angle
307,407 optimal blade pitch angle
309,409 blade pitch angle threshold.

The invention claimed is:

1. A method of controlling a wind turbine having a rotor to which at least one rotor blade is connected, the method comprising:
   operating the rotor according to a first rotational speed reference;
   operating the rotor according to a second rotational speed reference above the first rotational speed reference if a fluctuation of an actual rotational speed of the rotor decreases below a fluctuation threshold and/or if a blade pitch angle of the rotor blade increases above a blade pitch angle threshold;
   wherein changing of operating the rotor according to the first rotational speed reference to operating the rotor according to the second rotational speed reference comprises:
   supplying a control signal indicative of the second rotational speed reference to a turbine controller;
   determining a decrease of an actual pitch angle based on a relationship between a power coefficient of the rotor blade versus blade pitch angle; and
   decreasing the blade pitch angle according to the determined decrease of the blade pitch angle.

2. The method according to claim 1, wherein the rotor is operated according to the first rotational speed reference if the fluctuation of the actual rotational speed of the rotor increases above another fluctuation threshold which is above the fluctuation threshold and/or if the blade pitch angle of the rotor blade decreases below another blade pitch angle threshold which is below the blade pitch angle threshold.

3. The method of claim 2, wherein the rotor is operated according to the first rotational speed reference if the fluctuation of the actual rotational speed of the rotor increases above the another fluctuation threshold which is above the fluctuation threshold and/or if the blade pitch angle of the rotor blade decreases below the another blade pitch angle threshold which is below by 1° to 3° the blade pitch angle threshold.

4. The method according to claim 1, wherein the blade pitch angle threshold lies above an optimal blade pitch angle to which an optimal power coefficient is associated.

5. The method according to claim 4, wherein a decrease of the power coefficient with increasing blade pitch angle is smaller at the optimal blade pitch angle than at the blade pitch angle threshold.

6. The method according to claim 4, wherein an aerodynamic thrust coefficient is larger at the optimal blade pitch angle than at the blade pitch angle threshold.

7. The method according to claim 1, wherein controllability of the rotor is better at blade pitch angles above the blade pitch angle threshold than at blade pitch angles below the blade pitch angle threshold.

8. The method according to claim 1, wherein the second rotational speed reference is determined based on the actual blade pitch angle.

9. The method of claim 8, wherein the second rotational speed reference is determined based on a deviation of the blade pitch angle from the blade pitch angle threshold.

10. The method according to claim 1, wherein operating the rotor according to the second rotational speed reference is performed if the blade pitch angle of the rotor blade is in a blade pitch angle range comprising blade pitch angles above the blade pitch angle threshold and below a further blade pitch angle threshold.

11. The method according to claim 1, wherein operating the rotor according to a first rotational speed reference is performed in a wind speed range, where the actual rotational speed is substantially maintained constant according to the first rotational speed reference, wherein within the wind speed range the blade pitch angle is adjusted by increasing the blade pitch angle with increasing wind speed.

12. The method according to claim 11, wherein operating the rotor according to a second rotational speed reference is performed in a further wind speed range above the wind speed range.

13. The method according to claim 1, wherein, when operating the rotor according to the second rotational speed reference, power output of the wind turbine is increased relative to when operating the rotor according to the first rotational speed reference.

14. The method according to claim 13, further comprising:
    monitoring at least one electrical component of the wind turbine for an operational condition;
    increasing, when operating the rotor according to the second rotational speed reference, power output, if the monitored operational condition of the electrical component allows increase of the power output.

15. The method according to claim 14, wherein the electrical component of the wind turbine comprises at least one of:
    a converter;
    a transformer;
    a cable;
    a capacitor;
    an inductor; and
    a filter,
    wherein the operational condition of the electrical component comprises at least one definition of:
    a temperature of the electrical component;
    a cooling of the electrical component; and
    an electrical load of the electrical component.

16. An arrangement for controlling a wind turbine having a rotor to which at least one rotor blade is connected, the arrangement comprising:
    a speed-blade pitch controller adapted to operate the rotor according to a first rotational speed reference,
    wherein the speed-blade pitch controller is adapted to operate the rotor according to a second rotational speed reference above the first rotational speed reference if a fluctuation of an actual rotational speed of the rotor decreases below a fluctuation threshold and/or if a blade pitch angle of the rotor blade increases above a blade pitch angle threshold,
    wherein changing of operating the rotor according to the first rotational speed reference to operating the rotor according to the second rotational speed reference comprises:
    supplying a control signal indicative of the second rotational speed reference to a turbine controller;
    determining a decrease of an actual pitch angle based on a relationship between a power coefficient of the rotor blade versus blade pitch angle; and
    decreasing the blade pitch angle according to the determined decrease of the blade pitch angle.

* * * * *